(12) United States Patent
Doyle

(10) Patent No.: US 7,792,862 B2
(45) Date of Patent: Sep. 7, 2010

(54) METHOD AND APPARATUS FOR IDENTIFYING FEATURES OF MULTIDIMENSIONAL IMAGE DATA IN HYPERMEDIA SYSTEMS

(75) Inventor: Michael D. Doyle, Wheaton, IL (US)

(73) Assignee: Eolas Technologies, Inc., Tyler, TX (US)

( * ) Notice: Subject to any disclaimer, the term of this patent is extended or adjusted under 35 U.S.C. 154(b) by 0 days.

(21) Appl. No.: 12/040,194

(22) Filed: Feb. 29, 2008

(65) Prior Publication Data

US 2008/0163038 A1 Jul. 3, 2008

Related U.S. Application Data

(63) Continuation of application No. 10/613,980, filed on Jul. 5, 2003, now Pat. No. 7,362,323.

(51) Int. Cl.
*G06F 17/30* (2006.01)
(52) U.S. Cl. ...................................................... 707/792
(58) Field of Classification Search .................. 707/10, 707/102, 526; 709/202, 218, 219, 316; 717/109; 713/178; 718/106; 719/310, 315; 345/419, 345/427, 619, 638, 649, 653–656, 180
See application file for complete search history.

(56) References Cited

U.S. PATENT DOCUMENTS

| | | | |
|---|---|---|---|
| 4,686,522 A | 8/1987 | Hernandez | |
| 4,847,604 A * | 7/1989 | Doyle | 345/180 |
| 5,096,427 A | 3/1992 | Sadigh-Behzadi | |
| 5,708,845 A | 1/1998 | Wistendahl | |
| 5,737,553 A | 4/1998 | Bartok | |
| 5,940,538 A | 8/1999 | Spiegel | |
| 5,982,372 A | 11/1999 | Brush | |
| 5,987,509 A | 11/1999 | Portuesi | |
| 5,990,941 A | 11/1999 | Jackson | |

(Continued)

FOREIGN PATENT DOCUMENTS

GB 2298769 A 9/1996

OTHER PUBLICATIONS

Doyle, et al., "The Visible Embryo Project: Embedded Program Objects for Knowledge Access, Creation, & Management . . . " Comp. Medical Imaging & Graphics, vol. 20 No. 6, pp. 423-431, Dec. 1996.

(Continued)

*Primary Examiner*—Diane Mizrahi
(74) *Attorney, Agent, or Firm*—Charles E. Krueger

(57) ABSTRACT

In one embodiment, a method of serving information to a distributed hypermedia browser comprises receiving a request from the browser at an Internet server to locate information, transmitting a message from the Internet server to a database server in response to receiving the request to locate information, searching a database on the database server for descriptive information for at least one feature in a multi-dimensional image having more than two dimensions and having a plurality of features, providing location information from the database server to indicate the location of the feature, receiving a response comprising the location information at the Internet server from the database server, and transmitting at least a portion of the response from the database server to the browser.

16 Claims, 4 Drawing Sheets

U.S. PATENT DOCUMENTS

| | | | |
|---|---|---|---|
| 6,057,854 | A | 5/2000 | Davis, Jr. et al. |
| 6,121,981 | A | 9/2000 | Trower |
| 6,230,167 | B1 | 8/2001 | Libscomb |
| 2006/0174209 | A1* | 8/2006 | Barros ........................ 715/764 |
| 2008/0232658 | A1* | 9/2008 | Sugaya et al. ............... 382/128 |

OTHER PUBLICATIONS

Anonymous. QuickTime VR Tutor, Apr. 29, 1997, downloaded from www.devworld.apple.com on Aug. 8, 1998, pp. 1-65.

Miller, et al., The Virtual Museum: Interactive 3D Navigation of a Multimedia Database, The Jounal of Visualization and Computer Animation, (1992) vol. 3, pp. 183-197.

Doyle, Michael D., New Method of Identifying Features of an Image on a Digital Video Display, Proceedings SPIE, vol. 1380, Biostereometric Technology and Applications (1990), published Apr. 1991, pp. 86-95.

In re Goodman, 11 F.3d 1046, 29 USPQ2d 2010 (Fed. Cir. 1993).
In re Longi, 759 F. 2d 887, 225 UPQ 645 (Fed. Cir. 1985).
In re Van Ornum, 686 F.2d 937, 214 USPQ 761 (CCPA 1982).
In re Vogel, 422 F.2d 438, 164 USPQ619 (CCPA 1970).
In re Thorington, 418 F.2d 528, 163 USPQ 644 (CCPA 1969).

* cited by examiner

| IDENTIFIER | PROGRAM ACTION |
|---|---|
| 00000000000000000000000 | Applet 1 |
| 00000000000000000000001 | URL1 |
| 00000000000000000000010 | TIF1 |
| ⋮ | ⋮ |
| 11111111111111111111111 | Applet N |

4010 — IDENTIFIER
4020 — PROGRAM ACTION

Figure 4

METHOD AND APPARATUS FOR IDENTIFYING FEATURES OF MULTIDIMENSIONAL IMAGE DATA IN HYPERMEDIA SYSTEMS

RELATED APPLICATIONS

This is a continuation of U.S. patent application Ser. No. 10/613,980, filed Jul. 5, 2003 which is a continuation of U.S. patent application Ser. No. 09/825,570, filed Apr. 3, 2001 (U.S. Pat. No. 6,616,701 issued Sep. 9, 2003), which is a continuation of U.S. patent application Ser. No. 09/316,496, now abandoned, filed May 21, 1999, which claims priority from a Provisional Application Ser. No. 60/086,620, now abandoned, filed May 23, 1998.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever

COMPUTER PROGRAM LISTING APPENDIX

A computer program listing appendix is submitted on a compact disc containing files named Tcl-based applet, created 17 Apr. 2006, of size 6.0 KB and named Exemplary object index, image map and secondary image map, created 17 Apr. 2006, of size 46.1 KB. and the compact disc is hereby incorporated by reference.

TECHNICAL FIELD

The present invention relates to a method and apparatus for identifying features of multidimensional image data in hypermedia systems.

BACKGROUND OF THE INVENTION

The World Wide Web ("Web" or "Internet") provides a simple mechanism, called an image map or ISMAP, for linking two-dimensional spatial data (e.g., images) to related symbolic information such as Universal Resource Locators (URLs). Image maps are a simple technology that link simple polygonal regions within images, often referred to as hotspots (e.g., a graphically defined area in an image), to the locations of data objects on the Internet via a hyperlink. Web image maps currently are the standard mechanism used for creating graphically attractive user interfaces to Web pages. For example, an image could be made into an image map by assigning hotspots to each region of interest on the image. Unfortunately, the standard polygon-based ISMAP technology used in most Web image map systems can only work with simple polygon maps, and becomes either intolerably slow or totally unusable for mapping high-resolution images with large numbers of irregularly shaped objects, such as, for example, objects in the medical anatomy image data which comprise the National Library of Medicine's Visible Human Project.

U.S. Pat. No. 4,847,604, which is hereby expressly incorporated by reference, describes a method and apparatus to provide additional information concerning a feature of a displayed image by pointing to the location of the feature. The U.S. Pat. No. '604 provides for the correlation of particular locations in the image with the additional information for two-dimensional images. A need exists to provide such correlation for multidimensional images.

BRIEF DESCRIPTION OF THE DRAWINGS

FIG. 4 illustrates an exemplary database table according to an exemplary embodiment of the present invention.

DESCRIPTION OF EXAMPLE EMBODIMENTS

OVERVIEW

A multi-dimensional object indexing system allows many discrete objects to be mapped within a single multi-dimensional dataset. A secondary spatial image of an original image is correlated using a multi-dimensional coordinate value to provide an object index for each object defined in the original multi-dimensional image.

DESCRIPTION

Figure 1:
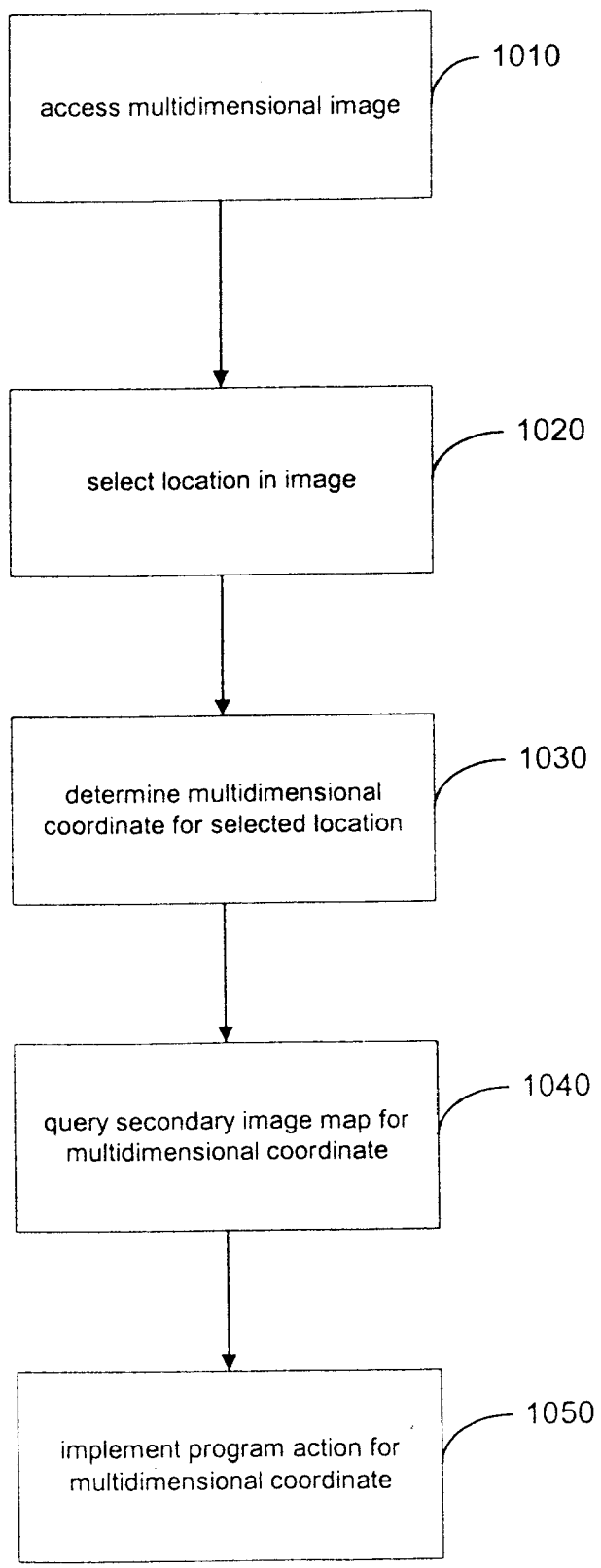
FIG. 1 illustrates a flowchart for a method of identifying features of multidimensional image data according to an exemplary embodiment of the present invention.

FIG. 1 illustrates an exemplary flowchart for a method of identifying features of multidimensional image data according to an exemplary embodiment of the present invention. For example, at 1010 an image is accessed, such as a multi-dimensional image or animated GIF image on a web page. At 1020, a location in the image is indicated, for example by clicking on a part of the image using a mouse or other interface device, the image having been preprocessed to be an image map as described, for example, in the U.S. Pat. No. '604 or as described below with regard to FIG. 2.

At 1030, a multidimensional coordinate location is determined for the location identified at 1020. For example, the image map may be a two-dimensional representation (e.g., x-y) of a three dimensional image, such as a three dimensional medical anatomy image maintained by the National Library of Medicine's Visible Human Project. The two-dimensional representation may reflect a particular third dimension view. For example, a particular slice of the image may be shown to a user thus providing a predetermined third dimension, or z-value, for the representation of the image displayed to the user. Accordingly, selecting a particular location on the representation defines the x and y values for the location and the third dimension is already defined. As a result, the multi-dimensional coordinates of the selected image location can be determined.

In an alternative exemplary embodiment of the present invention, the selection of a image for correlation with additional information may be a multi-step process. For example, an image of an entire anatomical body could be presented to a user and a general area of the image selected, such as the chest, head or abdomen. In response, a detailed view of the related region could be displayed to the user. The user would then select a particular location in the image and receive additional information related to the selected location. As noted above, the images presented to the user will generally be two-dimensional representations viewed on a predetermined or selectable third dimension. In addition, the original image can be manipulated, rotated or sliced for viewing in a preferred orientation. The image location eventually selected by a user, regardless of the orientation and display of the image, will correspond to a particular multi-dimensional coordinate which can be correlated with additional information as described below.

Alternatively, the image map could be a video clip having x and y values for each frame of the video clip and the third dimension, in this case time, would be determined by the particular frame of the video clip. Thus, multi-dimensional values can be determined for an indicated location. The present invention is not limited, however, to three dimensions as four or more dimensions can be processed according to exemplary embodiments of the present invention. For example, a three dimensional image dataset that changes through time would provide for four dimensions (e.g., x, y, z and time).

At 1040 a secondary map is queried for the determined multi-dimensional value where, for example, a given x,y,z coordinate in the original image data corresponds to an homologous x,y,z location in the secondary "map" of, for example, 24-bit voxels (e.g., three-dimensional pixels). The 24-bit voxel found at that location in the secondary map then acts as a unique 24-bit object index for the image feature in the original data. At 1050, the system then performs a database table lookup for that 24-bit index in order to find the related descriptive text information or "hot data," which may be in the form of, for example, HTML code, a URL pointer to a remote Web resource, or Tcl-based applet code. Using the 24-bit voxel allows as many as 16 million discrete objects to be mapped within a single three-dimensional dataset. If desired, even more objects could be mapped in the dataset by using 32-bit voxels. Using an exemplary embodiment of the present invention, animated GIFs, AVIs and MPEGs can be processed to provide enhanced functionality to a Web page to extend image capabilities to multi-dimensional datasets.

Figure 2:
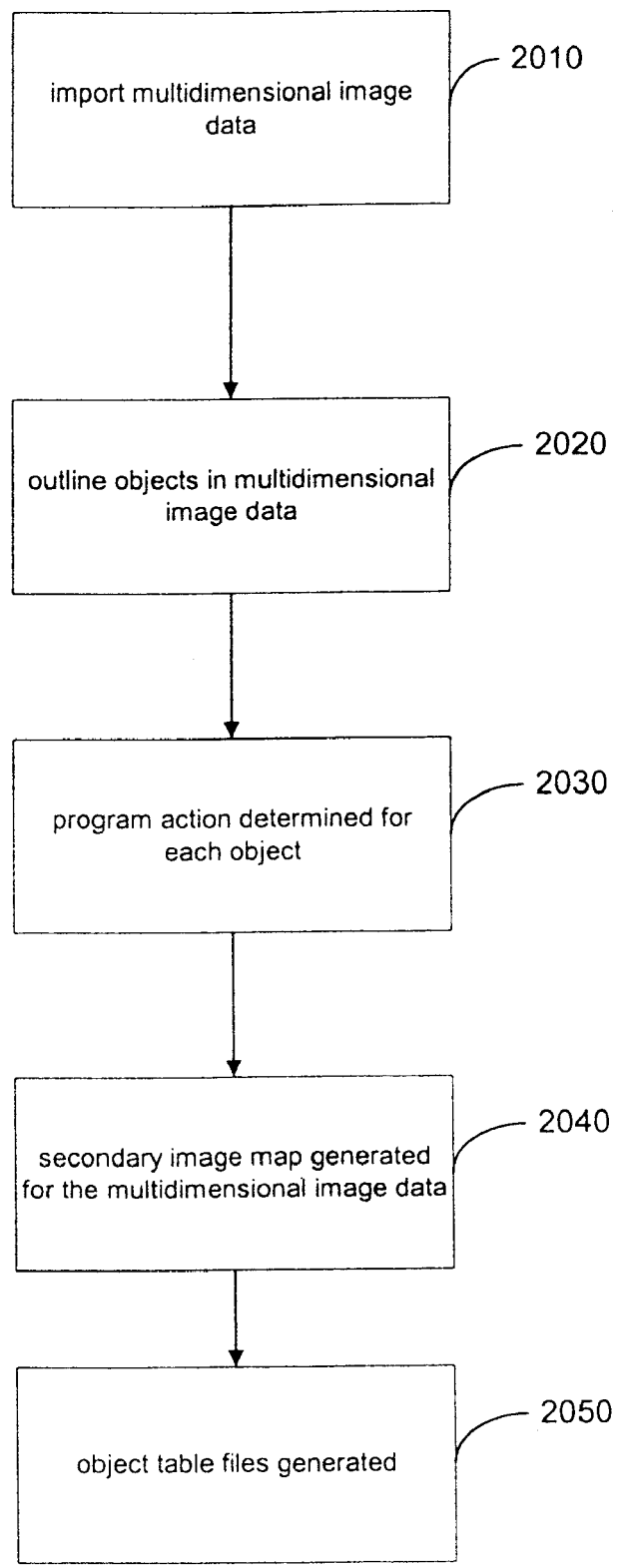
FIG. 2 illustrates a flowchart for a method of processing multi-dimensional image data according to an exemplary embodiment of the present invention

FIG. 2 illustrates an exemplary flowchart for a method of processing image data according to an exemplary embodiment of the present invention. At 2010, multi-dimensional image data is imported. The image data can be, for example, a GIF file of an image or a JPEG or MPEG file of images. At 2020, objects in the image data (e.g., hotspots) are, for example, interactively outlined. An exemplary method for outlining the objects is described in the U.S. Pat. No. '604 although other conventional approaches known in the art may be used. The outlining of hotspots requires the user be presented, for example, a two dimensional representation of a multi-dimensional image as described above. Thus, additional dimensions can be predefined for the two-dimensional views presented to a user. At 2030, a program action is determined and associated for each object in the image data. For example, the program action can display explanatory text related to the object in the image or provide a link to a particular Web page. As described above, the program action can be in the form of, for example, HTML code, a URL pointer to a remote Web resource, or Tcl-based applet code.

At 2040, a secondary image map is generated for the image data. The secondary image map provides, for example, a spatial index of the image with equivalent spatial dimensions as the original image. The secondary image map utilizes, for example, unique 24-bit voxels to associate a unique 24-bit identifier with the pixels in an object outlined at 2020. Alternatively, pixels within an object can have different unique identifiers defining, for example, sub-regions in the object having associated program actions. Other object indices could be used instead of the 24-bit voxels, however, such as a list of polygons or some other indice that correlates a coordinate value in the original image with the secondary image map. The 24-bit values are, for example, arbitrarily assigned to groups of pixels or individual pixels in the object.

According to an exemplary embodiment of the present invention, each pixel in the object can be an independently addressable hotspot, including for multi-dimensional images. For example, for each mapped multi-dimensional image on a Web page, the Web server hosting the Web page stores the secondary image map. Each pixel or group of pixels in a hotspot defined for the image corresponds to, for example, a flat area of 24-bit color in the secondary image map, as each object pixel or group of pixels owns a unique 24 bit color in the secondary image map. While the primary (original) image is displayed to the user, the secondary image may is generally not shown to the user, although there may be circumstances in which it is desirable to show the secondary image map. At 2050, object table files are generated to associate the pixels in each object with the program action identified at 2030. The object table can have the form of, for example, a database lookup table indexed by the 24-bit voxels to find the corresponding program action for each pixel.

Figure 3:
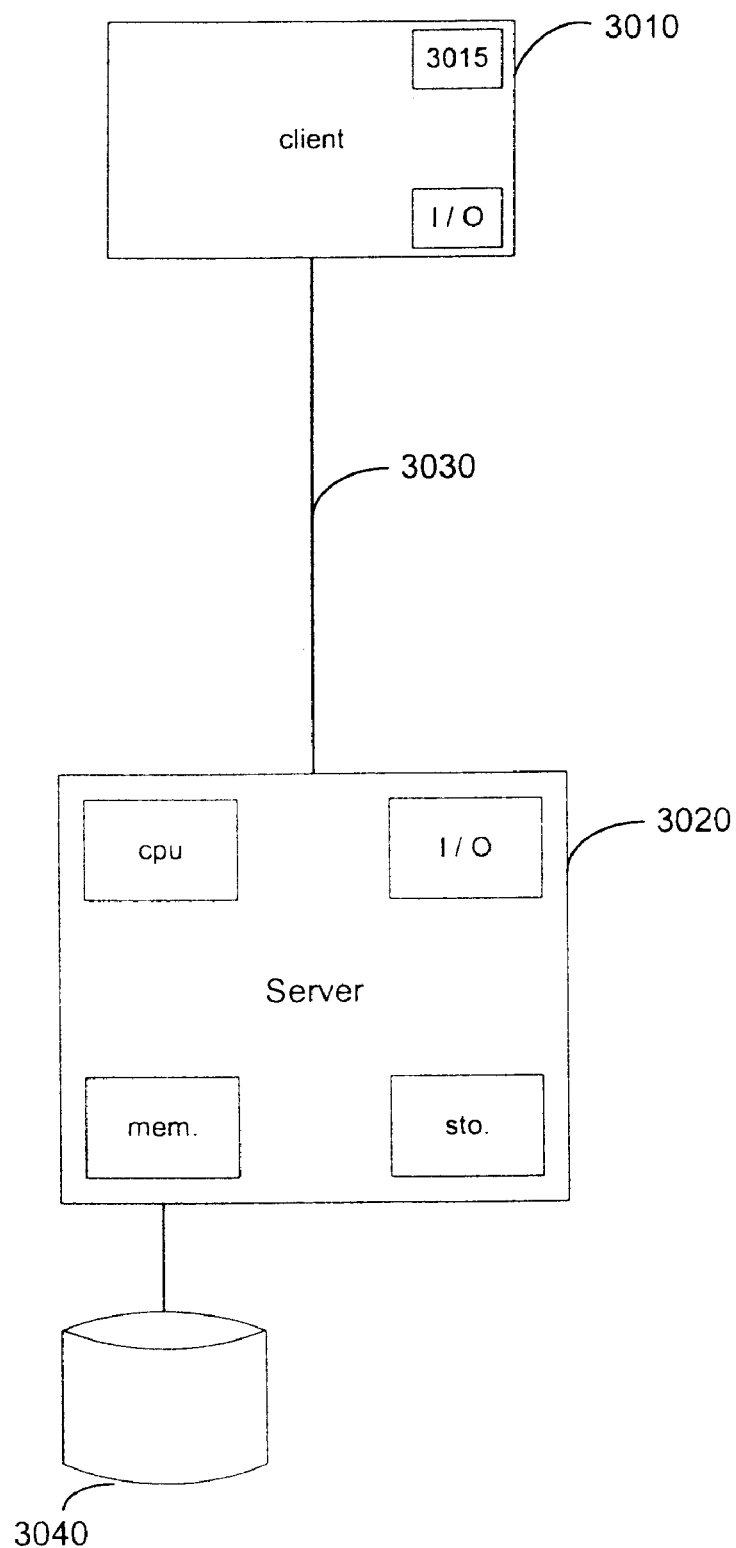
FIG. 3 illustrates an exemplary system for identifying features of multi-dimensional image data according to an exemplary embodiment of the present invention.

Exemplary operation of the method for identifying features in multi-dimensional image data is as follows and as illustrated in FIG. 3. When a user clicks on a location of a multi-dimensional image in an image map in a Web page via a Web browser, the Web browser sends the, for example, x-y coordinates of that location to the Web server. Web browser 3015 can include, for example, conventional Internet browser software such as NETSCAPE® browser software operating in a conventional desktop personal computer 3010, as illustrated in FIG. 3. Web browser 3015 transmits the x-y coordinates to Web server 3020 via a communications link 3030, such as a LAN, WAN, fiber optic, wireless or other conventional computer network communications link. Web server 3020 includes, for example, a conventional NT or SUN Microsystems server having a memory and processes the x-y coordinates to generate a multi-dimensional coordinate value.

As described above, the third dimension may be predetermined as a function of the image presented to the user such as a particular "slice" of an image or a frame of a video clip. Once the multi-dimensional coordinate value is determined, the Web server 3020 launches a, for example, Java-based CGI program to find the corresponding multi-dimensional coordinate value in the secondary image map to determine the unique 24 bit value corresponding to the pixel clicked on in the image by the user. The CGI program then sends the 24-bit value to a, for example, Tcl-based server which takes the 24-bit value and fetches a record from the database lookup table for the corresponding program action to be taken, or the Web server 3020 itself processes the 24-bit value and uses the value as an index into database 3040 coupled to Web server 3020 to determine the program action to be performed. The program action is relayed back by the Web server 3020 for display to the user at client computer 3010, usually in a frame next to the image map. The program action can include, for example, browser redirection, encapsulated HTML, dynamic HTML and downloading and running full-frame applets in the user's Web page. Other program actions can be performed as well. FIG. 4 illustrates an exemplary database table associating a program action 4020 with each identifier 4010 in the database table, such as each unique 24-bit value.

Thus, according to an embodiment of the present invention, individual pixels or voxels in objects of multi-dimensional image data can be automatically linked to desired program actions in contrast to prior art systems which are limited to indexing of two-dimensional Web images.

The additional dimension added to the indexing of image maps can vary as a function of the type of image data displayed. Thus, for example, the additional dimension could be the z-coordinate for three-dimensional images or the time dimension for video clips or both for three-dimensional image data recorded over time as well as additional dimensions. Like the multi-dimensional image data, the secondary image map according to an exemplary embodiment of the present invention can have n-dimensions. In addition, the individual pixels in an object of a multi-dimensional image can be individually addressable. Moreover, by adding a dimension to a standard image map request protocol in accordance with an exemplary embodiment of the present invention, the display of an image on a client side of computer network can be independent of the server performing the object identification in the image, thus allowing the capabilities provided by the present invention to be implemented using conventional personal computers or even less powerful devices such as handheld computers or smartphones.

An exemplary implementation of the method according to an embodiment of the present invention is illustrated below and uses a small (30K) Tcl-based client applet which downloads and runs within the user's Web browser page. For example, when a user accesses a web page with multi-dimensional image data to be viewed, an applet such as the applet described below would be automatically downloaded to the client computer. The applet would then, for example, fetch the appropriate image data, secondary image map and object index table and download the data to the client computer. The client computer web browser then interacts with the download applet to view the image data, for example in the manner described above. For example, the Tcl applet converts the image data back to a viewable image. If the image is a video clip, for example, then the video clip would be displayed to the user. The applet program then waits for the user to click on a location in the video clip. When the user clicks a location, the frame number is determined and the x-y location of the click is determined as described previously, thereby enabling a multi-dimensional coordinate location for the click to be determined to use as an index into the secondary image map, from which the program action can be determined via an object index table.

Computer program listings for an exemplary Tcl-based client applet and exemplary object index, image, and secondary image map are included in appendices on the above-described compact disc.

An alternative exemplary implementation according to an embodiment of the present invention could use a small (30K) Tcl-based client applet similar to that described above which downloads and runs within the user's Web browser page but where the image data is not downloaded to the client computer but instead is remotely manipulated by the user. For example, the image data could be too large to download to the user. Such an applet would, for example, open a socket communications channel to a remote visualization server that stores and manipulates three dimensional image data. When the user makes a change to the controls in the applet GUI, such as to specify rotation around an axis, the remote visualization server would perform that computation on the data and transfers the resultant data display back to the user for viewing the result of the manipulation within the display frame of the client applet. The user could, for example, slice through the data at any angle and click upon any voxel on any slice surface to cause the associated descriptive text to be shown in the lower window of the applet, for example in the manner described above. The efficiency of this type of system is such that object identification and response occurs in nearly "real time" with identification speeds of, for example, approximately ½ second over 56 KB Internet connections.

In another alternate embodiment, given a user specified description, the descriptive information for the various features can be searched to determine whether there is a correspondence with the user specified description, in order to find the features responsive to the user specified description. The physical locations of the features on the displayed image are then indicated. An example method for searching the descriptive information is described in the incorporated-by-reference U.S. Pat. No. '604.

What is claimed is:

1. A method of serving information to a distributed hypermedia browser executing on a client workstation, the method comprising:

receiving a request from the browser at an Internet server, using an I/O interface of the Internet server, to locate information;

transmitting a message from the Internet server to a database server, using the I/O interface of the Internet server, in response to receiving the request to locate information;

searching a database on the database server, using a CPU on the database server for descriptive information for at least one feature in a multi-dimensional image having more than two dimensions and having a plurality of features;

determining location information, using the CPU on the database server, that indicates the location of the feature;

receiving a response comprising the location information at the Internet server, using the I/O interface at the Internet server, from the database server; and transmitting at least a portion of the response from the database server, using an I/O interface at the database server, to the browser.

2. A method of serving location information to a distributed hypermedia browser executing on a client workstation, the method comprising:

receiving a request from the browser at an Internet server, using an I/O interface of the Internet server, to locate at least one object in a multidimensional image;

transmitting a message from the Internet server to a database server in response to receiving the request;

searching a database on the database server, using a CPU on the database server, for descriptive information correlated to at least one object mapped in the multi-dimensional image, the image having more than two dimensions and having a plurality of objects mapped;

determining location information, using the CPU on the database server, that indicates the location of the object;

receiving a response comprising the location information at the Internet server, using the I/O interface of the Internet server, from the database server; and transmitting at least a portion of the response from the database server, using an I/O interface at the database server, to the browser.

3. A method of locating information with a distributed hypermedia browser executing on a client workstation, the method comprising:

sending a request from the browser to an Internet server, using an I/O interface of the Internet server, to locate information, the request causing one or more servers to:

transmit a message from the Internet server to a database server in response to receiving the request to locate information;

search a database on the database server, using a CPU on the database server, for descriptive information for at least one feature in a multi-dimensional image having more than two dimensions and having a plurality of features determining location information, using the CPU on the database server, that indicates the location of the feature;

receive a response comprising the location information at the Internet server using the I/O interface of the Internet server, from the database server; and transmit at least a portion of the response from the database server, using an I/O interface at the database server, to the browser.

4. A method of locating information with a distributed hypermedia browser executing on a client workstation, the method comprising:

sending a request from the browser to an Internet server to locate at least one object in a multidimensional image, the request causing one or more servers to:

transmit a message from the Internet server to a database server, using an I/O interface of the Internet server, in response to receiving the request;

search a database on the database server, using a CPU on the database server, for descriptive information correlated to at least one object mapped in the multi-dimensional image, the image having more than two dimensions and having a plurality of objects mapped;

determining location information, using the CPU on the database server, that indicates the location of the object;

receive a response comprising the location information at the Internet server, using the I/O interface of the Internet server, from the database server; and transmit at least a portion of the response from the database server, using an I/O interface at the database server, to the browser.

5. A method of providing communication channels for locating information with a distributed hypermedia browser executing on a client workstation, the method comprising:

providing network communication channels for receiving a request from the browser at an Internet server, using an I/O interface of the Internet server, to locate information, the request causing one or more servers to:

transmit a message from the Internet server to a database server, using the I/O interface of the Internet server, in response to receiving the request to locate information;

search a database on the database server, using a CPU on the database server, for descriptive information for at least one feature in a multi-dimensional image having more than two dimensions and having a plurality of features determining location, using the CPU on the database server, that indicates information the location of the feature;

receiving a response comprising the location information at the Internet server from the database server, using the I/O interface of the Internet server; and transmit at least a portion of the response from the database server, using an I/O interface at the database server, to the browser.

6. A method of providing communication channels for locating information with a distributed hypermedia browser executing on a client workstation, the method comprising:

providing network communication channels for receiving a request from the browser at an Internet server, using an I/O interface of the Internet server, to locate at least one object in a multidimensional image, the request causing one or more servers to:

transmit a message from the Internet server to a database server, using the I/O interface of the Internet server, in response to receiving the request;

search a database on the database server, using a CPU on the database server, for descriptive information correlated to at least one object mapped in the multi-dimensional image, the image having more than two dimensions and having a plurality of objects mapped;

determining location information, using the CPU on the database server, that indicates from the database server to indicate the location of the object;

receive a response comprising the location information at the Internet server from the database server; and transmit at least a portion of the response from the database server, using an I/O interface at the database server, to the browser.

7. A method of providing communication channels for locating information with a distributed hypermedia browser executing on a client workstation, the method comprising:

providing network communication channels for sending a request from the browser to an Internet server to locate information, the request causing one or more servers to:

transmit a message from the Internet server, using an I/O interface of the Internet server, to a database server in response to receiving the request to locate information;

search a database on the database server, using a CPU on the database server, for descriptive information for at least one feature in a multi-dimensional image having more than two dimensions and having a plurality of features determining location information, using the CPU on the database server, that indicates the location of the feature;

receiving a response comprising the location information at the Internet server, using the I/O interface of the Internet server, from the database server; and transmit at least a portion of the response from the database server, using an I/O interface at the database server, to the browser.

8. A method of providing communication channels for locating information with a distributed hypermedia browser executing on a client workstation, the method comprising:

providing network communication channels for sending a request from the browser to an Internet server to locate at least one object in a multidimensional image, the request causing one or more servers to:

transmit a message from the Internet server to a database server, using an I/O interface of the Internet server, in response to receiving the request;

search a database on the database server, using a CPU on the database server, for descriptive information correlated to at least one object mapped in the multi-dimensional image, the image having more than two dimensions and having a plurality of objects mapped;

determining location information, using the CPU on the database server, that indicates from the database server to indicate the location of the object;

receive a response comprising the location information at the Internet server using the I/O interface of the Internet server, from the database server; and transmit at least a portion of the response from the database server, using an I/O interface at the database server, to the browser.

9. One or more non-transitory computer-readable media with an executable programs stored thereon, wherein the programs instructs one or more processors to perform the following steps:

receive a request from the browser at an Internet server to locate information;

transmit a message from the Internet server to a database server in response to receiving the request to locate information;

search a database on the database server for descriptive information for at least one feature in a multi-dimensional image having more than two dimensions and having a plurality of features;

determine location information from the database server to indicate the location of the feature;

receive a response comprising the location information at the Internet server from the database server; and transmit at least a portion of the response from the database server to the browser.

10. One or more non-transitory computer-readable media with an executable programs stored thereon, wherein the programs instructs one or more processors to perform the following steps:

receive a request from the browser at an Internet server to locate at least one object in a multidimensional image;

transmit a message from the Internet server to a database server in response to receiving the request;

search a database on the database server for descriptive information correlated to at least one object mapped in the multi-dimensional image, the image having more than two dimensions and having a plurality of objects mapped;

determine location information at the database server to indicate the location of the object;

receive a response comprising the location information at the Internet server from the database server; and transmit at least a portion of the response from the database server to the browser.

11. One or more non-transitory computer-readable media with an executable programs stored thereon, wherein the programs instructs one or more processors to perform the following steps:

send a request from the browser to an Internet server to locate information, the request causing one or more servers to:

transmit a message from the Internet server to a database server in response to receiving the request to locate information;

search a database on the database server for descriptive information for at least one feature in a multi-dimensional image having more than two dimensions and having a plurality of features;

provide location information from the database server to indicate the location of the feature;

receive a response comprising the location information at the Internet server from the database server; and transmit at least a portion of the response from the database server to the browser.

12. One or more non-transitory computer-readable media with an executable programs stored thereon, wherein the programs instructs one or more processors to perform the following steps:

send a request from the browser to an Internet server to locate at least one object in a multidimensional image, the request causing one or more servers to:

transmit a message from the Internet server to a database server in response to receiving the request;

search a database on the database server for descriptive information correlated to at least one object mapped in the multi-dimensional image, the image having more than two dimensions and having a plurality of objects mapped;

provide location information from the database server to indicate the location of the object;

receive a response comprising the location information at the Internet server from the database server; and transmit at least a portion of the response from the database server to the browser.

13. One or more non-transitory computer-readable media with an executable programs stored thereon, wherein the programs instructs one or more processors to perform the following steps:

provide network communication channels for receiving a request from the browser at an Internet server to locate information, the request causing one or more servers to:

transmit a message from the Internet server to a database server in response to receiving the request to locate information;

search a database on the database server for descriptive information for at least one feature in a multi-dimensional image having more than two dimensions and having a plurality of features;

provide location information from the database server to indicate the location of the feature;

receiving a response comprising the location information at the Internet server from the database server; and transmit at least a portion of the response from the database server to the browser.

14. One or more non-transitory computer-readable media with an executable programs stored thereon, wherein the programs instructs one or more processors to perform the following steps:

provide network communication channels for receiving a request from the browser at an Internet server to locate at least one object in a multidimensional image, the request causing one or more servers to:

transmit a message from the Internet server to a database server in response to receiving the request;

search a database on the database server for descriptive information correlated to at least one object mapped in the multi-dimensional image, the image having more than two dimensions and having a plurality of objects mapped;

provide location information from the database server to indicate the location of the object;

receive a response comprising the location information at the Internet server from the database server; and transmit at least a portion of the response from the database server to the browser.

15. One or more non-transitory computer-readable media with an executable programs stored thereon, wherein the programs instructs one or more processors to perform the following steps:

provide network communication channels for sending a request from the browser to an Internet server to locate information, the request causing one or more servers to:

transmit a message from the Internet server to a database server in response to receiving the request to locate information;

search a database on the database server for descriptive information for at least one feature in a multi-dimensional image having more than two dimensions and having a plurality of features;

provide location information from the database server to indicate the location of the feature;

receiving a response comprising the location information at the Internet server from the database server; and transmit at least a portion of the response from the database server to the browser.

16. One or more non-transitory computer-readable media with an executable programs stored thereon, wherein the programs instructs one or more processors to perform the following steps:

providing network communication channels for sending a request from the browser to an Internet server to locate at least one object in a multidimensional image, the request causing one or more servers to:

transmit a message from the Internet server to a database server in response to receiving the request;

search a database on the database server for descriptive information correlated to at least one object mapped in the multi-dimensional image, the image having more than two dimensions and having a plurality of objects mapped;

provide location information from the database server to indicate the location of the object;

receive a response comprising the location information at the Internet server from the database server; and transmit at least a portion of the response from the database server to the browser.

* * * * *